United States Patent [19]

Pell et al.

[11] 4,373,808
[45] Feb. 15, 1983

[54] LASER DOPPLER ATTITUDE MEASUREMENT

[75] Inventors: Kynric M. Pell, Laramie, Wyo.; Robert G. Conard, Huntsville, Ala.

[73] Assignee: The United States of America as represented by the Secretary of the Army, Washington, D.C.

[21] Appl. No.: 198,322

[22] Filed: Oct. 20, 1980

[51] Int. Cl.³ .......................... G01B 11/26; G01C 1/00
[52] U.S. Cl. .................................... 356/152; 89/41 L; 356/5
[58] Field of Search ................ 89/41 L; 356/152, 141, 356/5

[56] References Cited

U.S. PATENT DOCUMENTS

| | | | |
|---|---|---|---|
| 3,811,774 | 5/1974 | Honeycutt et al. | 356/5 |
| 4,003,659 | 1/1977 | Conard et al. | 356/152 |
| 4,047,816 | 9/1977 | Pell et al. | 356/152 |
| 4,123,165 | 10/1978 | Brown et al. | 356/152 |

Primary Examiner—S. C. Buczinski
Attorney, Agent, or Firm—Nathan Edelberg; Robert P. Gibson; Freddie M. Bush

[57] ABSTRACT

A system is provided for remote determination of the attitude of a moving vehicle. The system utilizes two remotely located transmitting-receiving stations and two retroreflecting single plane roof prisms mounted on the vehicle which may exhibit high angular rates about a roll axis. The two remotely located transmitter-receiver stations provide laser tracking of the vehicle, continuously illuminating the vehicle with a laser beam located at each station so that the position of the vehicle relative to the remote stations is obtained. During tracking, the roof prisms located symmetrically on the vehicle provide both a return signal to the laser station regardless of the aspect angle of the vehicle and a doppler signal indicative of the vehicle aspect angle, from which the vehicle attitude is determined.

5 Claims, 4 Drawing Figures

LASER DOPPLER ATTITUDE MEASUREMENT

The invention herein may be manufactured, used, and licensed by or for the Government for governmental purposes without the payment to us of any royalties thereon.

BACKGROUND OF THE INVENTION

Laser radars are established in prior art teachings for determining flight vehicle attitude or range with automatic laser trackers, related receivers, and retroreflectors. In the "Radar Handbook" by M. I. Skolnik, McGraw-Hill Book Company, 1970, Chapter 37 discloses laser radars in detail. For example, pages 37-62 show laser tracking interconnected with a computer and tracking mount. In describing motion of a flight vehicle the variables that are involved are related to the vehicle position, roll rate, and attitude rates. Prior techniques of measuring these variables have used radar or laser radar and triangulation with three or more ground stations or high speed camera trackers and triangulation from three or more camera stations.

Attitude of a flight vehicle has also been obtained using two laser transmitter/receiver stations tracking of skewed reflectors on a vehicle. A single laser transmitter/receiver station will track skewed retroreflectors in sequence on the vehicle to determine the position, roll rate, and attitude in one plane, this plane being defined by the vehicle roll axis and the ground station. As the vehicle rotates each plane of retroreflected energy sweeps the ground station at a timed interval dependent upon the attitude of the vehicle. The reflector alignment on the surface of the vehicle is known and the roll rate is measured by a signal reflected from one of the skewed retroreflectors on the vehicle. These reflected laser pulses are detected and processed to resolve the position, roll and attitude (pitch and yaw) data. This skewed reflector method of measurement allows attitude of a flight vehicle to be determined with only two tracking stations, and is taught in U.S. Pat. No. 4,047,816 issued to Kynric M. Pell et al. Pell et al also derive the simplified mathematical representation for expressing the information using a right hand cartesian coordinate system, as shown in columns 3, 4, and 5 thereof.

SUMMARY OF THE INVENTION

The laser doppler attitude measurement system provides remote measurement of missile aspect angle and measurement of attitude based on the doppler shift of retroreflected laser radiation utilizing no more than 2 tracking stations. A pair of retroreflectors are located in a common plane parallel with and on opposite sides of the vehicle roll axis to simultaneously provide a retroreflective sigal back to a tracking station in response to an impinging laser tracking frequency. This pair of simultaneous response pulses provide a doppler signal which yields the missile roll axis aspect angle with respect to the single tracker. Providing a second aspect angle with respect to a second ground station allows the attitude of the vehicle in space to be determined.

DESCRIPTION OF THE PREFERRED EMBODIMENT

Figure 1:
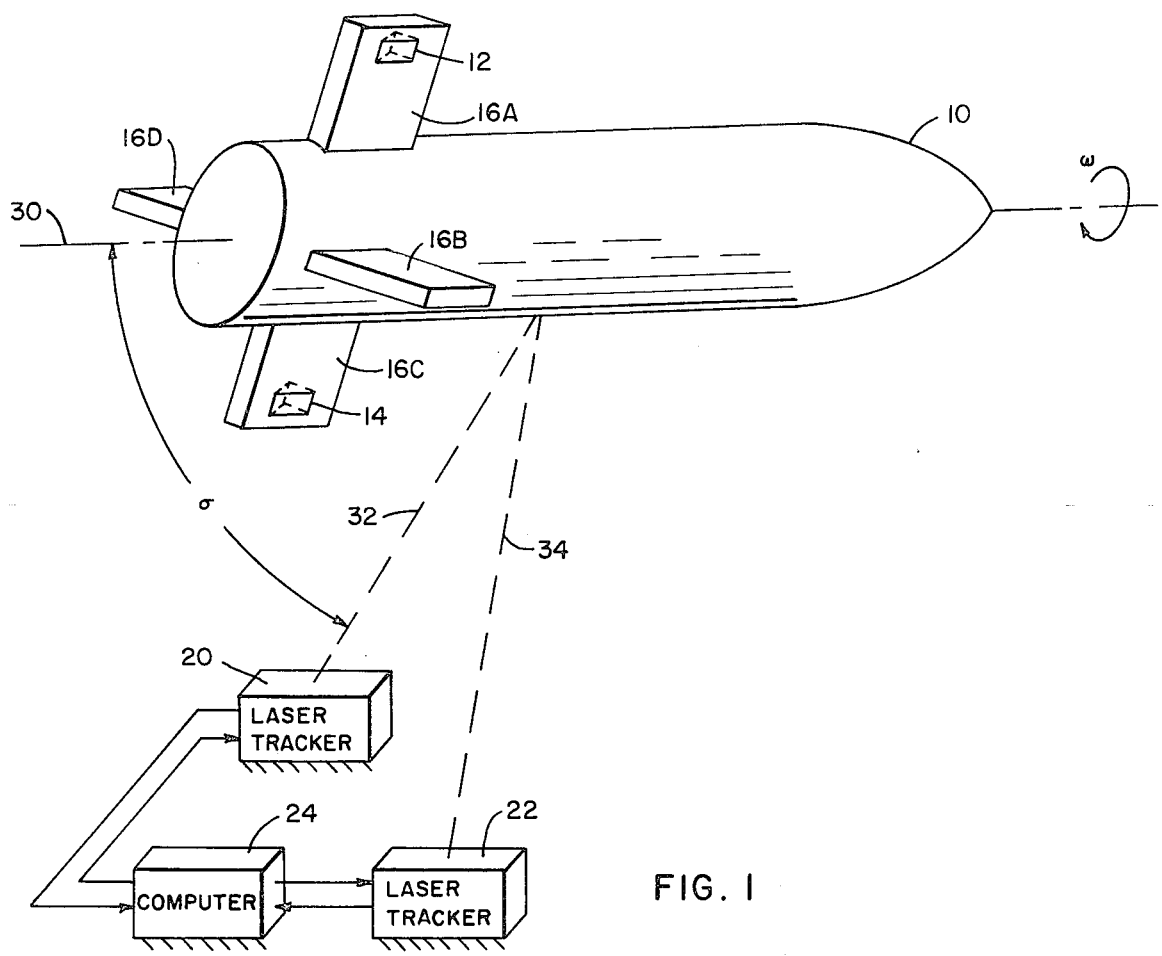
FIG. 1 is a diagrammatic view of a preferred embodiment for carrying out the method of vehicle attitude determination utilizing a pair of parallel retroreflectors.

Referring now to the drawings wherein like numerals represent like parts, FIG. 1 discloses a block diagram of a preferred embodiment of a system utilizing parallel plane reflectors for providing the aspect angle and attidue of a missile. In the system of FIG. 1, a flight vehicle or missile 10 is directed along a general trajectory toward a target area. Fins 16A-D provide stability to the vehicle. A pair of single plane retroreflectors 12 and 14 are located symmetrically in a plane including fins 16A and 16C of the missile to reflect incident laser energy. Laser tracks 20 and 22 are located off range for tracking the vehicle. The laser trackers each comprise a laser transmitter/receiver for directing coherent optical energy toward the missile and detecting coherent optical energy reflected from the missile. The laser tracker and retroreflector system allows near real time determination of the missile performance, which is accomplished by the laser tracker recording the analog input signals and/or coupling these signals to a digital computer 24 or other signal processing circuitry. Intelligence signals typically, are coupled to the computer and processed to provide a digital signal of the time of occurrence of return pulses in a computer compatible format. Alternatively, this data may be recorded on digital magnetic tape recorders. Each laser tracker has a continuous wave (CW) laser operated at different frequencies.

Figure 2:
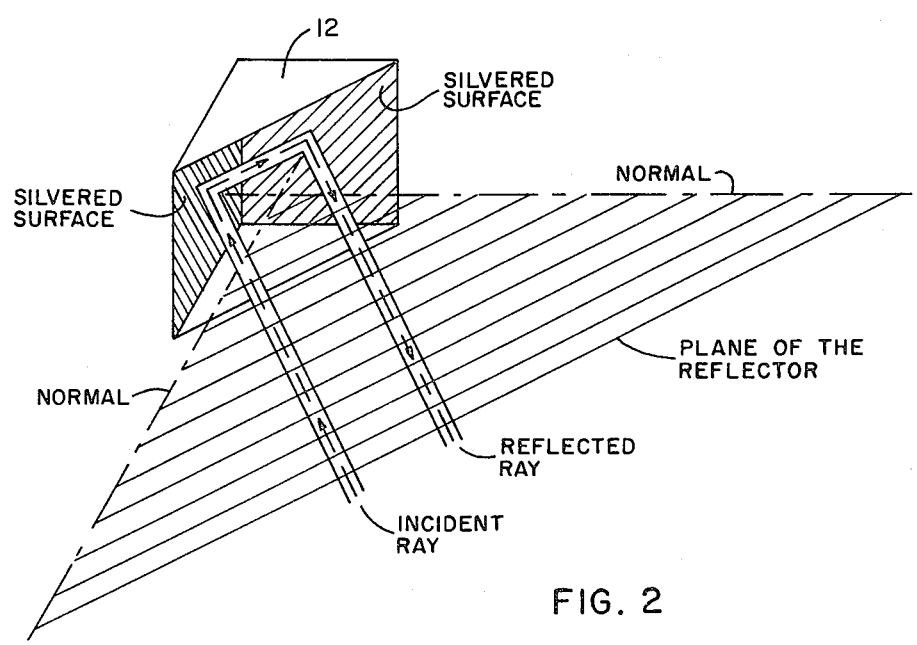
FIG. 2 is a graphical representation of a typical roof type prism for providing retroreflection.

FIG. 2 discloses a typical retroreflector 12, a 90° roof prism with two internal reflective surfaces, located at right angles to each other and silvered for reflection. Two lines (normals) emanating from the center of each silvered surface and perpendicular to their respective surfaces define a plane which may by defined as the plane of the retroreflector. A simple ray trace shows that a ray of light incident on one of the silvered surfaces and describing a path parallel to the plane of the retroreflector is generally reflected off the second surface back to the origin.

When a rolling vehicle is equipped with two 90° roof prisms and tracked so that it is continuously illuminated by a CW laser, a return signal of the CW radiation will be returned to the laser site each time the planes of the retroflectors pass through this ground station. The return signal from each reflector is in the form of a pulse, the width of which depends on the beam divergence angle, the range, the optical quality of the roof prisms, and the roll rate of the vehicle. The time interval between pulses is directly related to the roll rate of the vehicle, a pulse or pulse-pair being received once for each full revolution of the vehicle.

Figure 3:
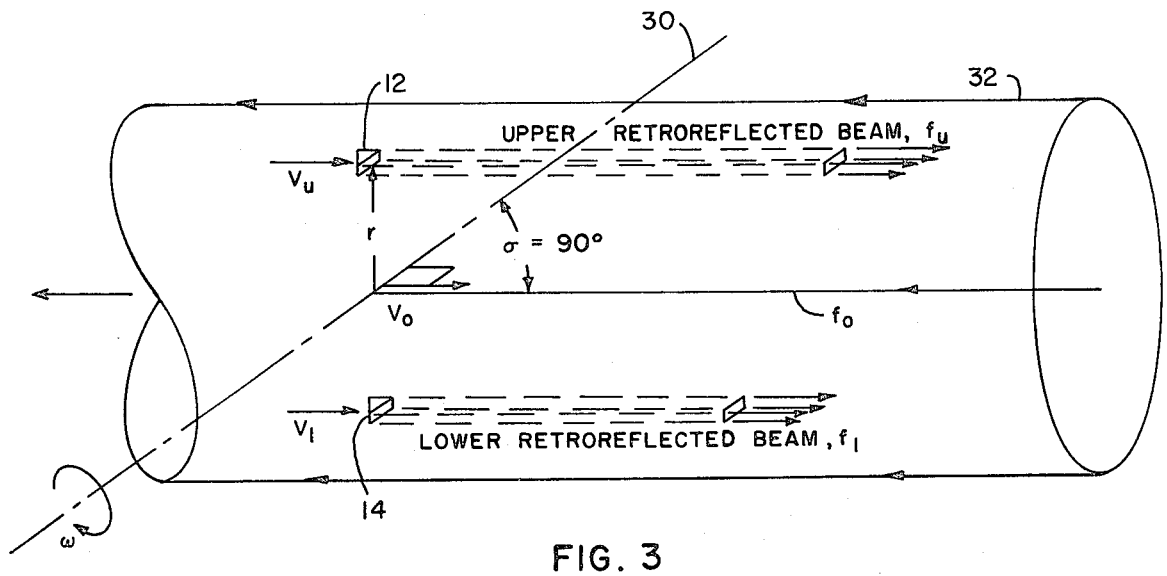
FIGS. 3 and 4 are geometry schematics for indicating the laser aspect angle to the reflectors.
Figure 4:
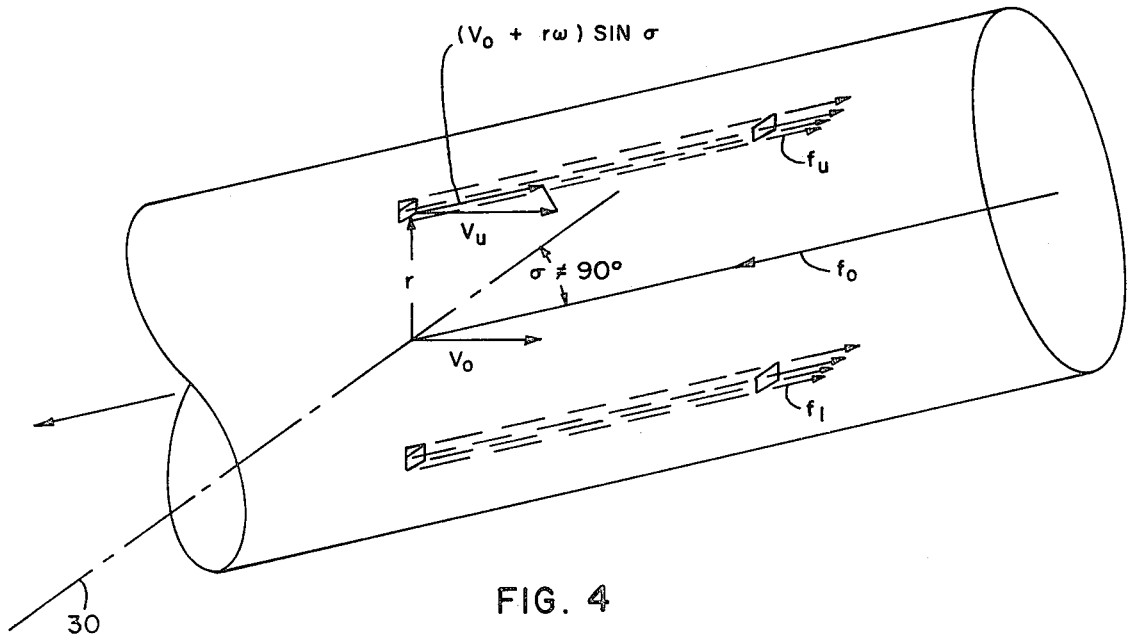

Retroreflectors 12 and 14 are both roof type prisms arranged in parallel. Prisms 12 and 14 may be disposed at other selectable positions on the vehicle surface for simultaneously reflecting collimated laser light back to its source. Each reflector functions as a single plane corner reflector so that collimated light incident on one surface of the array from a direction parallel to the retroreflection plane is retroreflected in the same plane. The prisms are disposed on the vehicle so that the retroreflective planes are parallel relative to each other. As shown in geometric schematics of FIGS. 3 and 4 the retroreflectors 12 and 14 are mounted on the fins of the missile a distance r from the vehicle axis of rotation 30.

The direction of rotation is given by $\omega$. For CW laser illumination 32 (incident laser beam $f_0$) from a laser tracker, each pulse of radiation $f_u$ and $f_l$ returned to the tracking station will contain frequency components which are doppler shifted with respect to the original CW laser frequency.

The frequency of radition returned from the lower roof prism is $$f_l = \frac{2v_l f_0}{c} + f_0 \tag{1}$$

where $v_1$ is the velocity of the roof prism with respect to the ground station, $f_0$ is the frequency of the laser radiation emitted from the laser, and c is the velocity of propogation of the radiation emitted from the laser. The relative velocity $v_1$ can be expressed in terms of the relative velocity of the roll axis $v_0$ and the roll rate $\omega$, as $$v_1 = v_0 - r\omega \tag{2}$$

so that the frequency of the radition returned from the lower roof prism $$f_l = \frac{2(v_0 - r\omega)f_0}{c} + f_0. \tag{3}$$

Similarly, the frequency returned from the upper prism is found to be $$f_u = \frac{2(v_0 + r\omega)f_0}{c} + f_0. \tag{4}$$

The difference between the two frequencies returned to the ground station is $$\Delta f = f_u - f_l = \frac{4r\omega}{c} f_0. \tag{5}$$

When the laser beam is at an aspect angle $\sigma$ with respect to the roll axis of the vehicle, the relative velocity along the line of sight of the laser beam (the component responsible for the doppler shift) is $(v_0 - r\omega) \sin \sigma$ for the lower beam and $(v_0 + r\omega) \sin \sigma$ for the upper beam. Therefore:

$$\Delta f = f_u - f_l = \frac{4r\omega}{c} f_0 \sin\sigma. \tag{6}$$

Since $f_0$, r, and c are known, and $\omega$ is inferred from the time interval between pulses returned to the ground station, the doppler frequency $\Delta f$ is measured by the computer or signal processing circuit and $\sigma$ is readily calculated, being the only unknown of equation 6.

For a system composed of two transmitter/receiver stations, the time interval measurements at the second station are accomplished in the same manner as those for the first station and provide the determination of a second aspect angle $\sigma_2$. Knowing $\sigma_1$ and $\sigma_2$ the attitude of the missile roll axis 30 can be resolved into any desirable coordinate system. The computer then converts the flow of data into selected vehicle performance parameters. Implementation of this technique requires that continuous tracking be maintained to provide continuous illumination of the missile with the CW laser and that the doppler shifted frequencies be measured to allow the respective aspect angles to be obtained. The roof prisms arranged symmetrically on the vehicle provide a return signal to the laser station regardless of the aspect angle. Since doppler frequency measurements can be made very accurately improved accuracy is obtained ove other attitude measurement methods.

A simplified mathematic representation utilizing two coordinate systems which may be used in determination of the attitude of a vehicle is shown in U.S. Pat. No. 4,047,816 issued to Kynric M. Pell et al as has been noted hereinabove, which is typical of the well established state of the art. Similarly, Brown et al in U.S. Pat. No. 4,123,165 discloses transformation from one coordinate system to another and references the Pell et al Patent. Kynric M. Pell is one of the co-inventors in the instant invention.

During operation, as vehicle 10 is launched into or flies into the tracking range of the tracking stations 20 and 22 a CW laser pulse is returned to each tracking station as the vehicle rotates and the respective stations are swept by the retroreflection plane of each prism. The time interval between pulses returning to the two stations from both arrays provide the data for determining vehicle attitudes. The time intervals between pulses are functions of the vehicle pitch and yaw or attitude allowing the performance parameters to be obtained. A return pulse of CW laser energy occurs simultaneously from reflectors 12 and 14. The incoming pulses are processed in the receiver electronics to provide the doppler signal output from which the aspect angle from each laser tracking station to the missile or roll axis 30 is obtained, thereby providing the data necessary to obtain attitude.

Although a particular embodiment and form of the invention has been described, it will be obvious to those skilled in the art that modification may be made without departing from the scope and spirit of the invention. For example, reflectors 12 and 14 may be inclined to the vehicle surface and mounted on the vehicle surface such that the planes of reflection for the two prisms are parallel for simultaneously directing return pulses of laser energy when impinged upon by a tracking beam. Accordingly, it is understood that the invention is limited only by the claims appended hereto.

We claim:

1. In a tracking system having plural tracking stations for determining the spatial attitude of an object having a longitudinal axis of rotation and wherein a beam of optical energy from a single source is directed from each tracking station toward the object and reflected back to the tracking station from the object, the improvement of first and second optical reflectors disposed on the surface of said object, said reflectors being disposed in a common plane passing through said longitudinal axis and spaced apart on opposite sides of said axis for simultaneously retroreflecting first and second pulses of impinging optical energy from a tracking station back to that tracking station during each period of periodic rotation.

2. A tracking system as set forth in claim 1 wherein each of said reflectors is a roof prism for providing single plane corner reflection, and the respective planes of reflection of said prisms being parallel.

3. A tracking system as set forth in claim 2 wherein said object is an airborne vehicle, and said prisms are located on respective first and second tail fins.

4. A tracking system as set forth in claim 3 wherein said plural tracking stations are two stations and said retroreflected pulses contain doppler shifted frequency components therein which are shifted in opposition.

5. In a tracking system having a transmitter-receiver at first and second separately established tracking stations and disposed for tracking a moving vehicle, a method of tracking said vehicle comprising the steps of:

launching a vehicle into a general flight trajectory;

directing respective first and second beams of radiant energy from each of said first and second separately established tracking stations toward said vehicle;

retroreflecting first and second pulses of said radiant energy simultaneously from first and second retroreflectors on said vehicle back toward the tracking stations for each of said first and second beams;

receiving said retroreflected energy by said tracking stations for processing to provide vehicle attitude;

rotating said vehicle around a longitudinal roll axis thereof and thereby rotating said reflectors around the vehicle longitudinal roll axis during tracking for periodically rotating said first and second retroreflectors into a plane with each of said tracking stations for providing pitch, yaw, and roll attitude data, and positioning said first and second reflectors on the surface of said vehicle prior to launch for providing the reflectors in a common plane passing through said longitudinally axis, spaced apart from each other and the vehicle longitudinal axis on opposite sides of said axis for providing said first and second simultaneously retroreflected radiant energy pulses, said pulses being doppler shifted in opposition.

* * * * *